United States Patent [19]

Yahara

[11] Patent Number: 5,040,078
[45] Date of Patent: Aug. 13, 1991

[54] IMAGE PROCESSING APPARATUS DISPLAYING BOUNDARIES OF AN ORIGINAL IMAGE

[75] Inventor: Masashi Yahara, Yokohama, Japan

[73] Assignee: Canon Kabushiki Kaisha, Tokyo, Japan

[21] Appl. No.: 378,702

[22] Filed: Jul. 12, 1989

[30] Foreign Application Priority Data

Jul. 15, 1988 [JP] Japan ............................... 63-175242
Jul. 15, 1988 [JP] Japan ............................... 63-175243

[51] Int. Cl.$^5$ ............................................. H04N 1/40
[52] U.S. Cl. ................................... 358/448; 358/449
[58] Field of Search ................. 358/449, 448, 452, 453

[56] References Cited

U.S. PATENT DOCUMENTS 4,439,790 3/1984 Yoshida ............................... 358/434

FOREIGN PATENT DOCUMENTS 0218447 4/1987 European Pat. Off. .
3421079 12/1984 Fed. Rep. of Germany .
21442798 1/1985 United Kingdom .
2147767 5/1985 United Kingdom .
2173969 10/1986 United Kingdom .
2216362 10/1989 United Kingdom .

OTHER PUBLICATIONS

Journal "Druckwelt": Special Issue of Feb. 15, 1988 for the Fair Imprinta 88 from Feb. 18–24, 1988, pp. 48, 114–166.
"Newsmaster" Complete Program Manuel, 1986, Kyocera Umisom Inc.

Primary Examiner—Edward L. Coles, Sr.
Attorney, Agent, or Firm—Fitzpatrick, Cella, Harper & Scinto

[57] ABSTRACT

An image processing apparatus capable of displaying boundaries of an original includes a reader for reading an image of the original and outputting corresponding image information. Forming circuitry is provided for forming boundary information indicating the boundaries of the original. Adding circuity is provided for adding, to the image information output from the reader, image information representing the boundaries of the original, based on the boundary information formed by the forming circuitry.

13 Claims, 11 Drawing Sheets

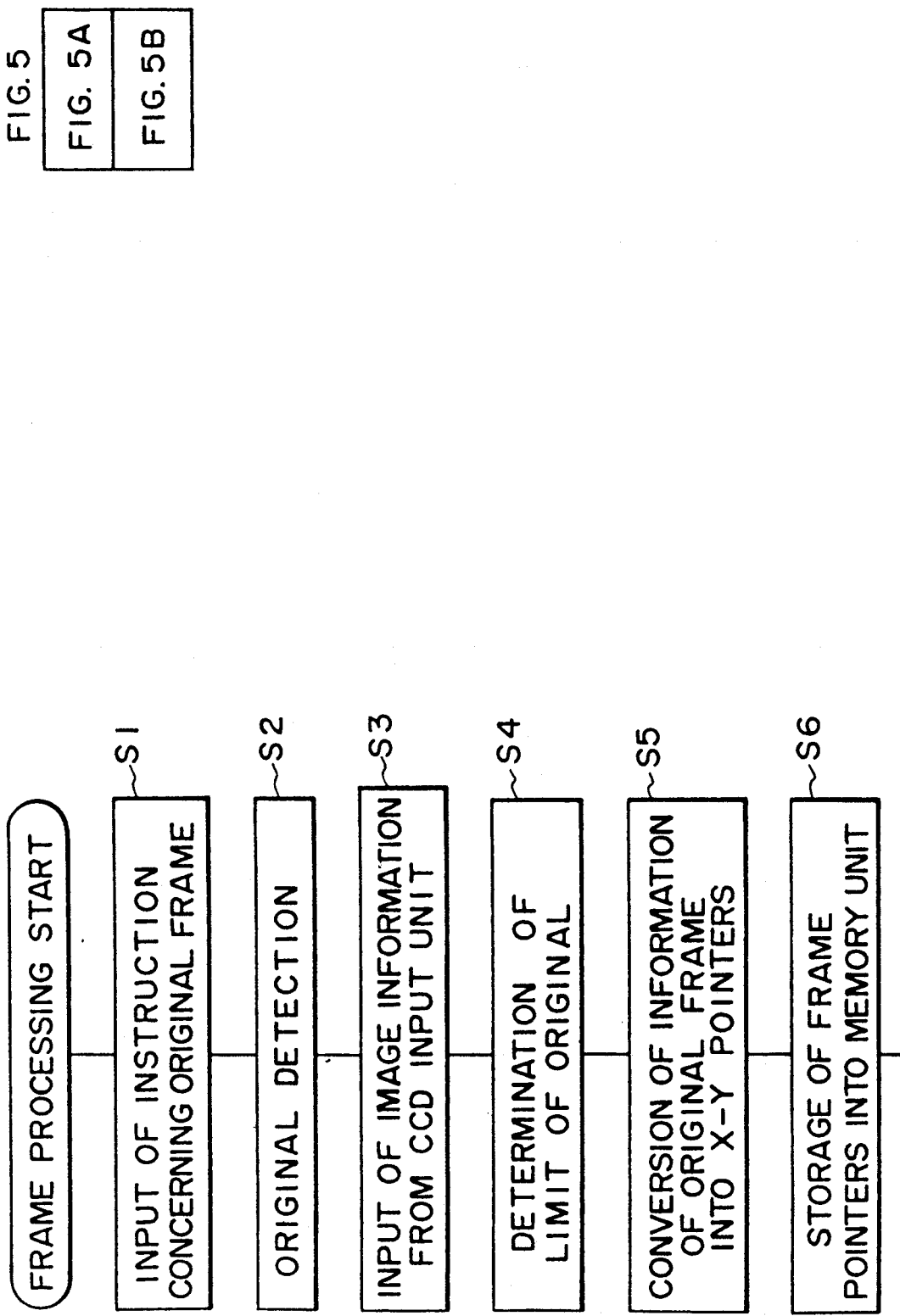

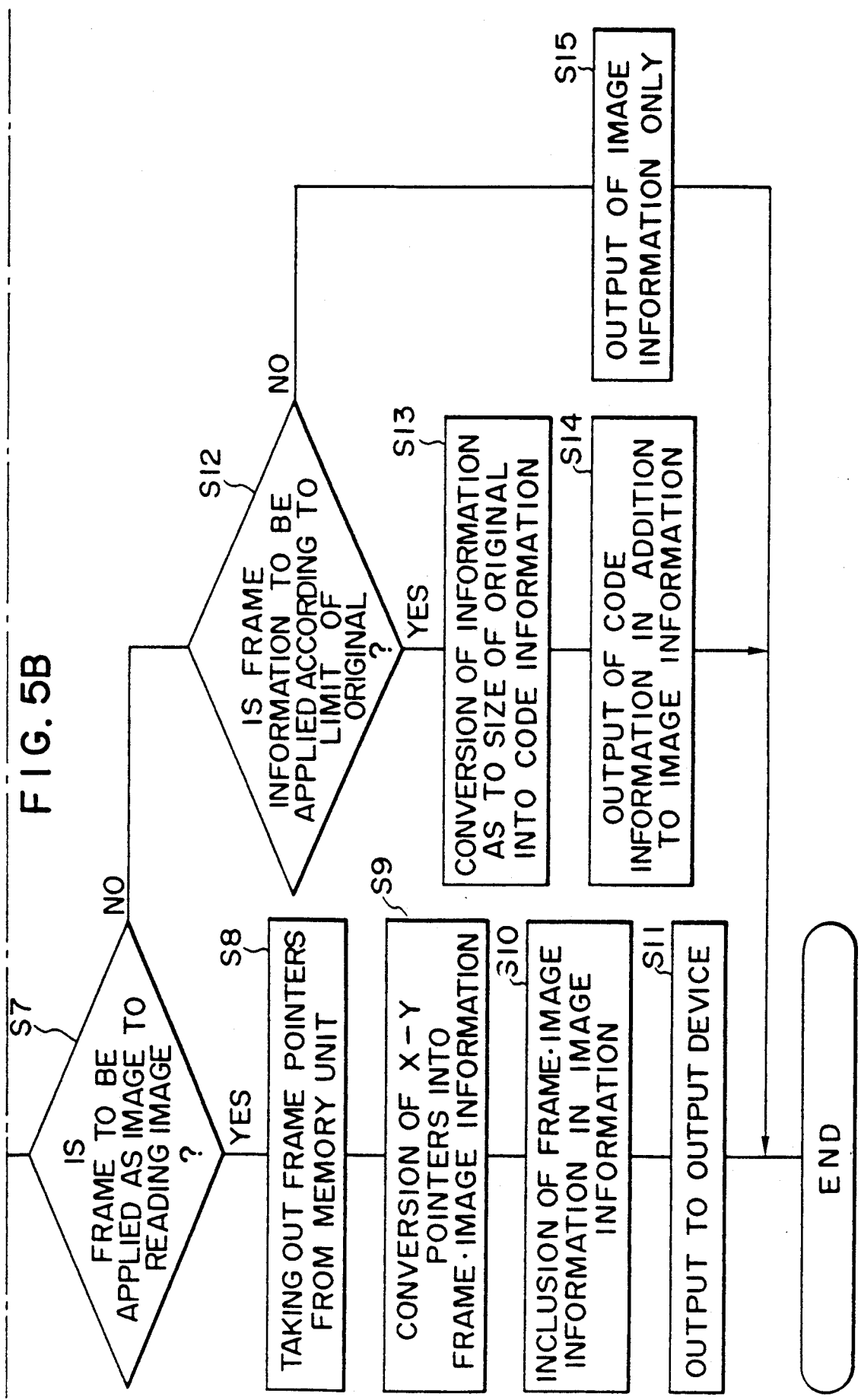

IMAGE PROCESSING APPARATUS DISPLAYING BOUNDARIES OF AN ORIGINAL IMAGE

BACKGROUND OF THE INVENTION

1. Field of the Invention

The present invention relates to an image processing apparatus for processing image information obtained by reading an image with an image sensor such as CCD.

2. Related Background Art

In a conventional image processing apparatus for processing the image information obtained by reading the image of an original document with an image sensor, as disclosed in the U.S. Pat. No. 4,439,790, among the image signals read by the image sensor, only those relating to the image are considered effective and entered for processing.

In such image processing apparatus, after reading the original document with the image sensor, the image information of only the image therein is released from said apparatus. Consequently, if the size of the image released to a display unit or a printer is smaller than the display frame of the display unit or the recording sheet, the image, for example characters, appears as if it is suspended in the air as shown in FIG. 1. Such image is not easy to look at, and the boundary between the original document and the background is often unrecognizable.

Particularly in an electronic image file in which plural image information are stored in a memory medium such as a magnetooptical disk and are retrieved afterwards, the size of the original document or the image arrangement thereon cannot be identified from the retrieved image.

There has therefore been desired an image processing apparatus capable of solving such drawbacks and clarifying the boundary between the image of the original document and the background, thereby improving the legibility of the image. Also desired is such apparatus capable of clarifying the boundary between the image of the original document and the background, even on a printer or a display unit.

SUMMARY OF THE INVENTION

In consideration of the foregoing, an object of the present invention is to provide an image processing apparatus capable of clarifying the boundary between the image of an original document and the background, thereby improving legibility of the image.

Another object of the present invention is to provide an image processing apparatus capable of clarifying the area of the original, in reproducing the stored information of the original image.

Still another object of the present invention is to provide an image processing apparatus capable, when necessary, of clarifying the original document and the background in reproduction.

The foregoing objects of the present invention, and the advantages thereof, will become fully apparent from the following description.

BRIEF DESCRIPTION OF THE DRAWINGS

FIG. 5, consisting of FIGS. 5A and 5B, is a flow chart of a control sequence executed by an MPU 13 shown in FIG. 3;

DESCRIPTION OF THE PREFERRED EMBODIMENTS

Now the present invention will be clarified in detail by embodiments thereof shown in the attached drawings.

Figure 1:
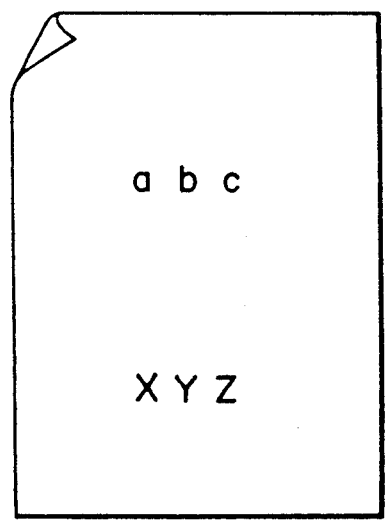
FIG. 1 is a schematic view of an example of conventional recording.
Figure 2A:
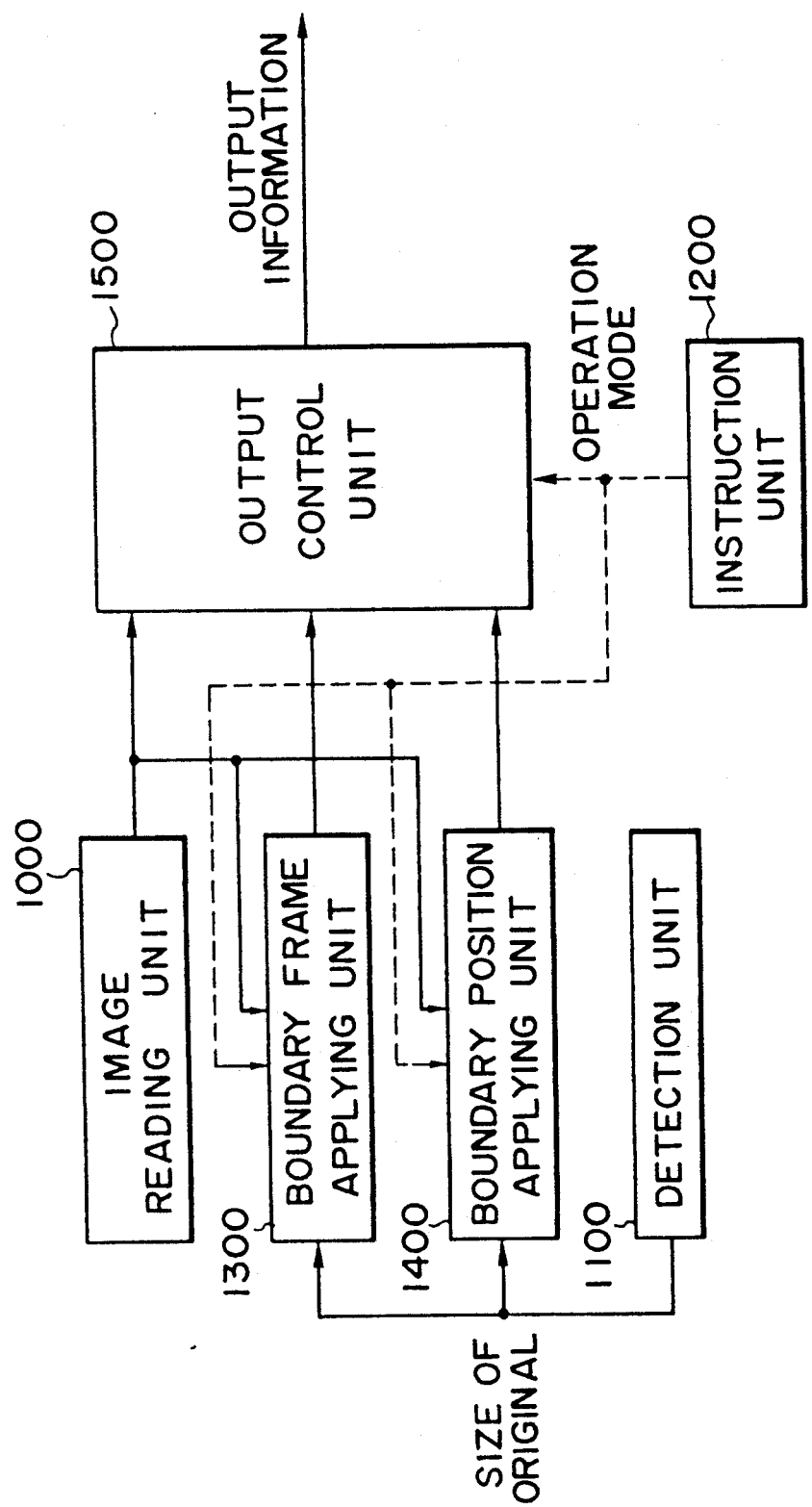
FIG. 2A is a block diagram of a first basic structure of the present invention.

FIG. 2A shows a first basic structure of the image processing apparatus embodying the present invention.

Referring to FIG. 2A:

1000 is an image reading unit for reading an original image;

1100 is a detection unit for detecting the area (size and position) of said original;

1200 is an instruction unit for selecting one of a boundary frame addition mode, a boundary position addition mode, and a non-addition mode;

1300 is a boundary frame addition unit for adding, when said boundary frame addition mode is selected, a boundary frame indicating the area of said original around the image read by said image reading unit 1000, based on the area of said original detected by said detection unit 1100;

1400 is a boundary position adding unit for adding, when said boundary position adding mode is selected, the area of said original detected by said detection unit 1100 in the form of position information such as code data, to the image information read by said image reading unit 1000; and 1500 is an output control unit for releasing the image information read by said image reading unit 1000 without any change when said non-addition mode is selected.

Figure 2B:
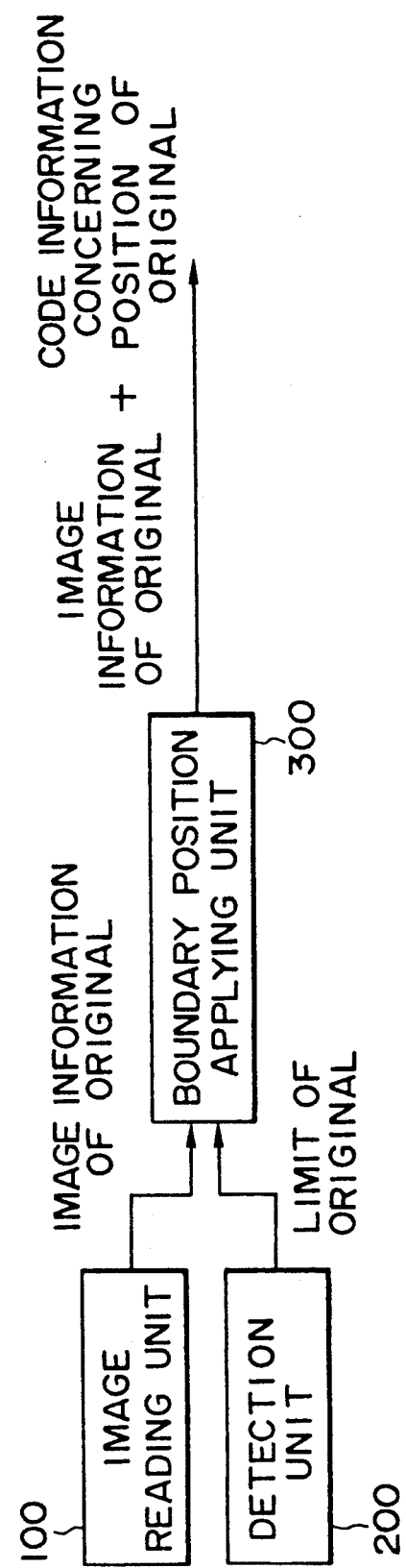
FIG. 2B is a block diagram of a second basic structure of the present invention.

FIG. 2B shows a second basic structure of the image processing apparatus embodying the present invention.

Referring to FIG. 2B:

100 is an image reading unit for reading an original image;

200 is a detection unit for detecting the area (size and position) of said original; and 300 is a boundary position adding unit for adding, to the image information read by said image reading unit 100, the area of said original detected by said detection unit 200 in the form of position information.

In the structure explained in FIG. 2A, a selection can be made on whether or not to add the frame and on the form of the frame to be attached, but in the structure shown in FIG. 2B the frame is always attached without selection.

Figure 3:
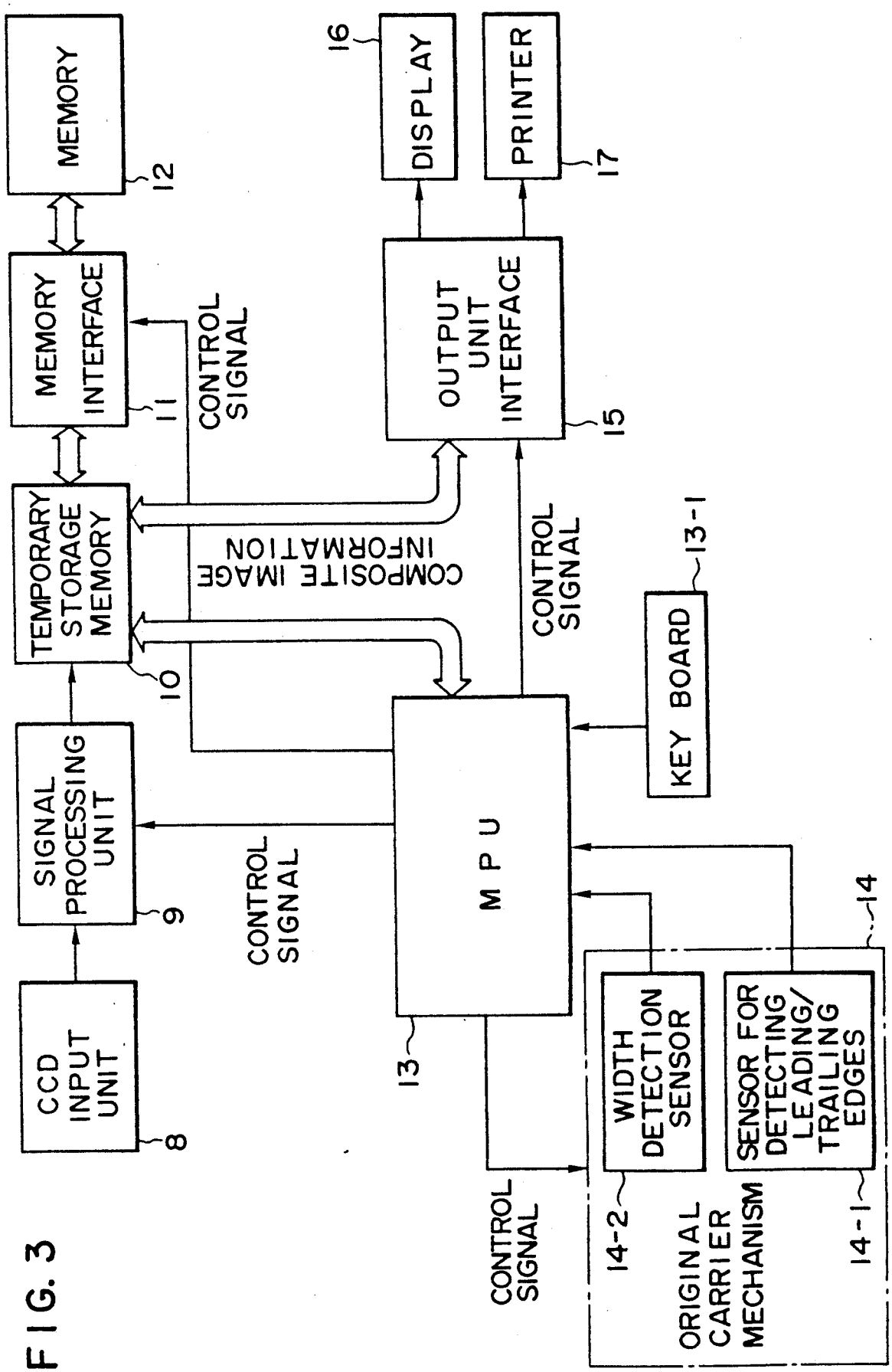
FIG. 3 is a block diagram of an embodiment of the present invention.

FIG. 3 shows an embodiment of the image processing apparatus shown in FIG. 2A.

Referring to FIG. 3, there are provided:

an image input unit 8 for photoelectric conversion of the original image, composed for example of a light source for illuminating the original, and a lens for focusing the reflected light from the original onto a solid-state image sensor such as a CCD;

a signal processing unit 9 of a known structure for amplifying the analog image information released from the image input unit 8 and converting said information into digital image information; and a memory 10 for temporarily storing the image information of at least a page released from the signal processing unit 9. The image information stored in the memory 10 is either stored in a memory unit 12 utilizing a magnetooptical disk through a memory interface 11, or released to a display unit 16 or a printer 17 through an output interface 15, under the control of a central processing unit (MPU) 13.

The MPU 13 controls the entire apparatus according to the instructions of the operator entered through a keyboard 13-1, and recognizes the boundary of the original and the background, based on the outputs of sensors 14-1, 14-2 provided in the original transporting mechanism for the purpose of detecting the size and position (area) of the original. Also on the result of said recognition, the MPU 13 adds a frame indicating the boundary between the original and the background to the image information read from the memory 12, or adds data indicating the area (size) of the original to said image information.

Figure 4:
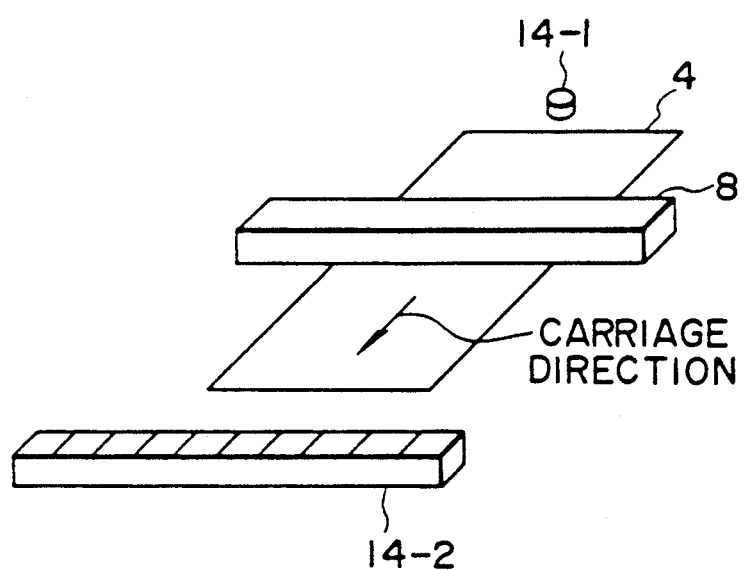
FIG. 4 is a perspective view of the arrangement of sensors 14-1, 14-2 shown in FIG. 3.

FIG. 4 shows the arrangement of the CCD input unit 8 and the sensors 14-1, 14-2 for detecting the position and size of the original, shown in FIG. 3.

As shown in FIG. 4, the sensor 14-2 is composed of plural photosensors arranged along the transverse direction of the original, and receives the light reflected from original to detect the both lateral ends of the original, whereby the MPU 13 calculates the width of the original. The sensor 14-1 is positioned in the original transporting path for detecting the front end and rear end of the original. The length of the original is calculated by the MPU 13, based on the timing of detection of the front and rear ends of the original by said sensor 14-1 and on the transporting speed of the original.

The CCD input unit 8 is positioned above the original transport path, for reading, line by line, an original document 4 transported with the image upwards by an unrepresented transport mechanism.

Though the sensors 14-1, 14-2 are provided in the present embodiment for detecting the position and size of the original, such detection can be made by the CCD input unit 8 alone. In such a case, the width of the original document is determined from positions where the output of the CCD input unit 8 changes from "1" corresponding to the white background color of the original document to "0". The length of the original document is calculated by the detection of the front end and rear end, from the timing of the shift of said output from "0" to "non-0" and that from "non-0" to "0".

FIG. 5 shows a control sequence to be executed by the MPU 13 shown in FIG. 3.

At first the MPU 13 stores, in an internal memory, an instruction on the mode entered by the operator through the keyboard 13-1, as to whether to release the image read from the original without change, or to add an image indicating the boundary of the original, or to add code data indicating the boundary of the original (step S1).

Then, in response to an instruction for image reading entered by the operator through the keyboard 13-1, the MPU 13 causes the image reading operation to start. At first an internal timer is started when the original is moved to a reference position by the original transport mechanism, and the times are measured until the front end and rear end of the original are detected by the sensor 14-1. Also, the width of the original is calculated from the output of the width sensor 14-2 (step S2).

Subsequently, starting from a timing when the original reaches the reading position of the CCD input unit 8, the MPU 13 stores the output of the CCD input unit 8 in the memory 12 through the temporary memory 10 (step S3).

The sequential order of the steps S2 and S3 is determined by the positional relationship of the CCD input unit 8 and the sensors 14-1, 14-2, and the step S3 for storing the output of the CCD input unit 8 may be conducted prior to the step S2 for detecting the original.

Figure 6:
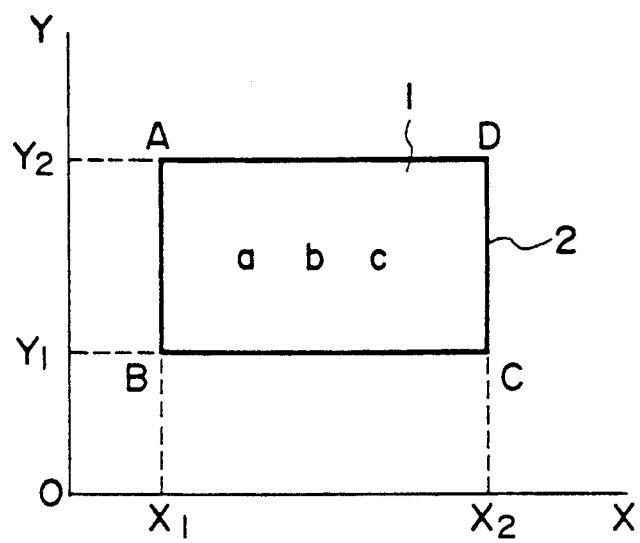
FIG. 6 is a schematic view showing the position and size of an original.

Then the boundary between the original and the outside is determined, based on the time measured by said internal timer and the width of the original calculated in the step S2 (step S4). Then, the coordinate positions (frame pointer) A, B, C, D of the ends of the original within the maximum reading range of the CCD input unit 8 (cf. FIG. 6) are calculated (step S5), and said pointer data are stored, through the temporary memory 10, in the memory 12 in relation with the image information (step S6).

Figure 7:
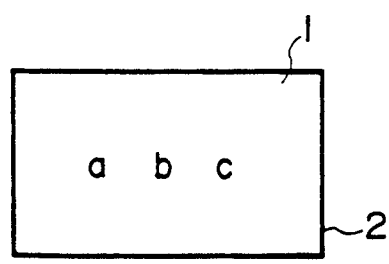
FIG. 7 is a schematic view showing the relative relationship between an original to be read and marks, indicating the boundary of the original, attached to the image information of the original.

Subsequently the MPU 13 effects the image processing, based on an instruction stored in the internal memory. If the operator instructs the addition of the boundary of the original as an image to the read image, the MPU 13 converts, based on the pointer information of the frame stored in the memory 12, the image information at the frame pointers, in the image information of the original read from the memory 12 and stored in the temporary memory 10, into predetermined marks as shown in FIG. 7, and releases said marks to the display unit 16 or the printer 17 (steps S7-S11).

In the present embodiment the boundary of the original is represented by special marks, but it is also possible to indicate the periphery of the original with a solid-lined or broken-lined rectangle obtained by connecting the pointers.

If the operator commands the addition of positional information concerning the boundary of the original to the read image, the MPU 13 converts the frame pointer information into code data such as X and Y coordinates of four points and releases said data together with the image information of the original which has been read from the memory and stored in the temporary memory 10 (steps S7, S12-S14).

If the operator orders the output of the read image without change, the MPU 13 releases the image information of the original stored in the memory 12 (steps S7, S12 and S15).

As explained in the foregoing, the area of the original is detected and is released in the form of positional information together with the image information of the original. Therefore, also in the output device such as a printer or display unit, it is possible to add a boundary frame to the original image based on the thus released data, so that the reproduced image is more easily understandable.

It is also possible, according to the commands of the operator, to obtain various image information, for example the read image accompanied by an image indicating the boundary of the original, or the read image without such boundary.

In the sequence shown in FIG. 5, the instruction whether or not to attach the frame is given prior to the reading of the original, but this instruction may be given at the retrieval of the image information from the memory 12. In such a case, the area of the original is recognized at the original reading as explained before, and the positional information (pointer information) is stored, together with the image information in the memory 12.

Then, the instruction whether or not to attach the image frame is given through the keyboard 13-1 prior to the reading of the image information from the memory 12, and, if the addition of the frame is commanded, there is conducted, as explained before, an operation for attaching the frame information to the image information obtained from the memory 12.

In this case, the addition of the image frame may be conducted even after the image information is stored in the memory 12. Consequently the operator can select, for example, a printout without the image frame, if the presence of such frame is considered unaesthetic.

Also instead of automatic detection of the area of the original from the outputs of the sensors 14-1, 14-2 and the CCD input unit 8, size input keys may be provided on the keyboard 13-1 for entering the area of the original into the MPU 13 for example in case of reading the originals of predetermined sizes.

In the foregoing embodiments, the frame information indicating the area of the original, recognized at the reading of the original image, is stored, for example in the form of code data, in the memory 12 together with the image information, and a frame is attached to the image when the image information is read from the memory 12.

In the following there will be explained a structure in which a frame image is synthesized with the image at the reading thereof.

Figure 8:
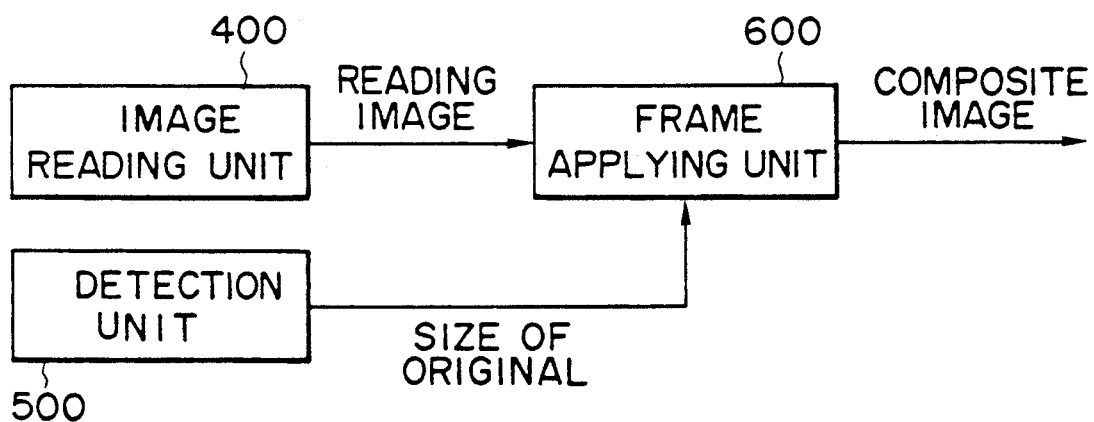
FIG. 8 is a block diagram of a third basic structure of the present invention.

FIG. 8 shows another basic structure of the present invention, wherein:

400 is an image reading unit for reading the image of an original;

500 is a detection unit for detecting the area of the original; and 600 is a frame adding unit for adding a frame or boundary marks indicating the frame position, in the form of image information, around the image information read by the image reading unit 400, based on the area of the original detected by the detection unit 500.

The specific structures and functions of the various units shown in FIG. 8 are the same as those shown in FIGS. 3 and 4 but the sequence of the frame addition operation of the MPU 13 is different. In the following, reference is made to FIG. 3 for explaining the control sequence relating to the frame addition.

Figure 9:
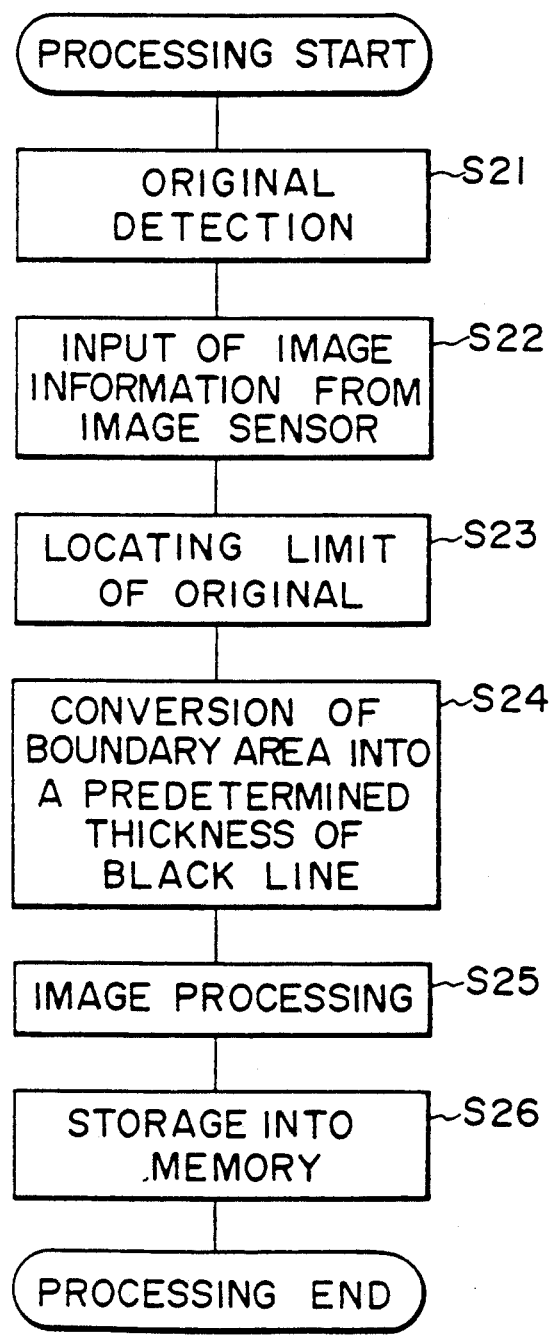
FIG. 9 is a flow chart of another control sequence executed by the MPU 13 shown in FIG. 3.

FIG. 9 is a flow chart of the control sequence for original image reading to be executed by the MPU 13 in the structure shown in FIG. 8.

The MPU 13 detects, from the output of the sensor 14-1, that the transported original has arrived at the position of said sensor 14-1 (step S21). Based on this position detection, there is determined the time when the front end of the original reaches the CCD input unit 8. Also based on the output of the width sensor 14-2, the MPU 13 calculates the width, position and length of the original.

From said time, the output of CCD input unit 8 is stored in the temporary memory 10 (step S22). At the same time the area of the original is discriminated from the outputs of the sensors 14-1, 14-2 (step S23). Then the MPU 13 changes the image corresponding to the external periphery of the original, among the image information stored in the temporary memory 10, to a line image of a predetermined thickness (step S24). For example, in case of a black-and-white image, said change can be achieved by changing the area of the temporary memory 10 corresponding to said external periphery to "1". Also in case of a color image, this is achieved by storing the image data of a predetermined color in the temporary memory 10.

Thereafter the MPU 13 executes the known image processing such as the conversion of background to white or the correction of tonal rendition on the original image accompanying the external frame, and stores the thus processed image information in the memory 12, thereby completing the control sequence (steps S25-S26).

Figure 10:
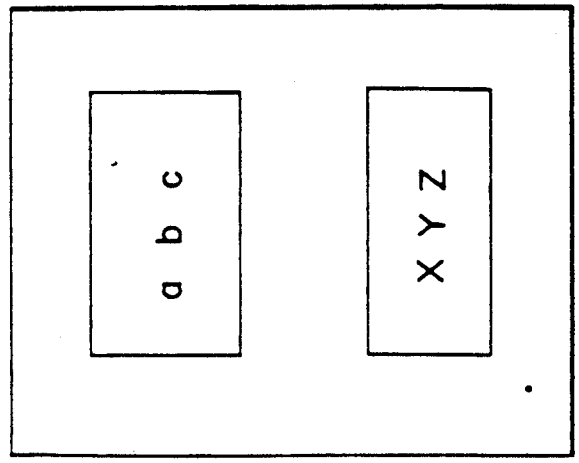

Thereafter the above-explained control sequence is repeated to effect the image reading down to the end of the original and the addition of the external peripheral line. After all of the synthesized image is stored in the memory 12, the MPU 13 reads the image information from the memory 12 at a desired timing and releases said information to the display unit 16 or the printer 17 through the temporary memory 10 and the output interface 15. The control sequence therefor is similar to that shown in FIG. 5 and will not therefore be explained in detail. As shown in FIG. 10, the image with the external peripheral line, obtained for example from the printer 17 has a clear boundary between the area of original and the background, thus being easier to look at.

In the following there will be explained the applications of the present embodiment.

Figure 12:
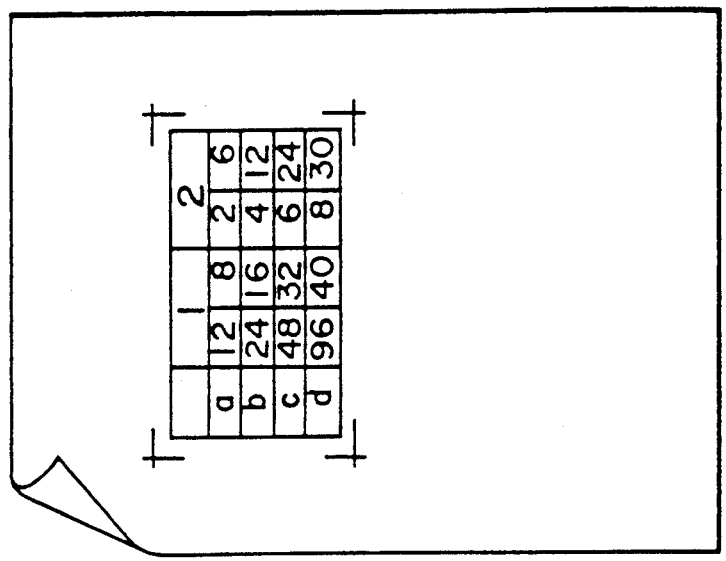
FIGS. 10 to 12 are schematic views showing examples of recording in an embodiment of the present invention.
Figure 11:
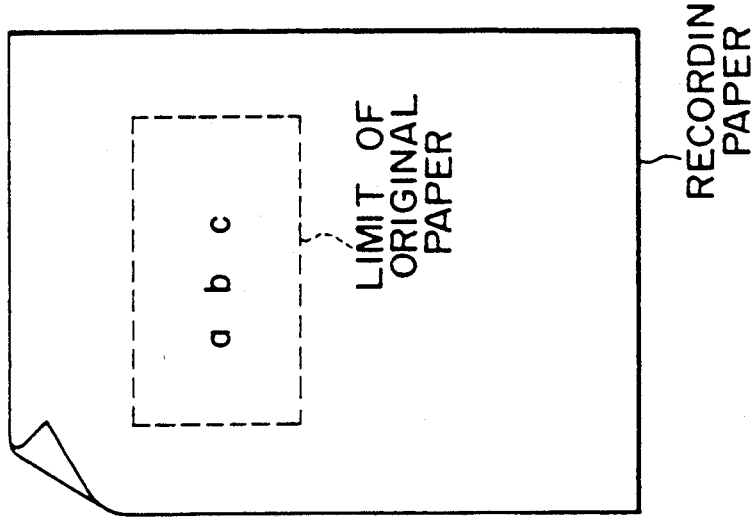

In the foregoing embodiment the periphery of the original is made visible with a solid line, but it is also possible to attach a broken line to the image as shown in FIG. 11. It is furthermore possible to attach a one-dot chain line or a two-dot chain line of predetermined form, or, as shown in FIG. 12, marks indicating the size of the original.

The external peripheral image can be made with a desired form, by storing the information relating to the image to be added, such as the thickness or form of said line, in the internal memory of the MPU 13 and selecting the line to be added by the keyboard 13-1 or selector switches.

Also in the foregoing embodiment, the external area outside the frame attached to the image information of the original is completely changed to white, but it is also possible to effect the image processing also in said external area and to convert it to white when the information is sent from the memory 12 to the output device.

As explained in the foregoing, a predetermined image such as a frame or boundary marks, indicating the boundary of the original, is attached to the read image based on the detected size of the original, so that the external frame is made visible on the output image, thus improving the visibility.

Also, as shown in FIG. 8, the frame indicating the area of the original is attached in the form of image information at the reading of the original image and stored in the memory 12, so that, if the disk of the memory 12 is mounted on another apparatus, there can be obtained the image with synthesized frame even if said another apparatus does not have the frame adding function.

The present invention has been explained by preferred embodiments thereof, but the present invention is not limited to such embodiments and is subject to various modifications within the scope and spirit of the appended claims.

I claim:

1. An image processing apparatus comprising:
   reader means for reading an image of an original and outputting image information representing the image;
   detection means for detecting boundaries of the original;
   forming means for forming boundary information representing the boundaries of the original in accordance with the detection result of said detection means; and
   adding means for adding, to the image information representing the image of the original, the boundary information representing the boundaries of the original formed by said forming means.

2. An apparatus according to claim 1, further comprising image forming means for forming images of the image information to which the boundary information is added.

3. An apparatus according to claim 1, further comprising memory means for storing the image information to which the boundary information is added.

4. An image processing apparatus comprising:
   reader means for reading the image of an original and outputting corresponding image information;
   detection means for detecting boundaries of the original;
   memory means for storing boundary data representing the boundaries of the original detected by said detection means, together with the image information output from said reader means;
   forming means for forming boundary information representing the boundaries of the original in accordance with the boundary data stored in said memory means; and
   adding means for adding, to the image information read from said memory means, the boundary information representing the boundaries of the original formed by said forming means.

5. An apparatus according to claim 4, further comprising image forming means for forming images from the image information to which the boundary information is added.

6. An image processing apparatus comprising:
   reader means for reading the image of an original and outputting corresponding image information;
   adding means for adding, to the image information output from said reader means, image information representing the boundaries of the original, based on boundary information indicating the boundaries of the original; and
   selection means for selecting whether or not to cause said adding means to add to the image information the image information output from said reader means representing the boundaries of the original.

7. An apparatus according to claim 6, wherein said adding means comprises forming means for forming boundary information representing the boundaries of the original.

8. An apparatus according to claim 6, further comprising image forming means for forming images from the image information to which the boundary information is added.

9. An apparatus according to claim 6, further comprising memory means for storing the image information output from said reader means.

10. An image processing apparatus comprising:
    reader means for reading the image of an original and outputting image information representing the image;
    detection means for detecting boundaries of the original; and
    adding means for adding, to the image information representing the image of the original, boundary information representing the boundaries of the original in accordance with the detection result of said detecting means.

11. An apparatus according to claim 10, wherein said adding means comprises forming means for forming boundary information representing the boundaries of the original.

12. An apparatus according to claim 10, further comprising image forming means for forming images from the image information to which the boundary information is added.

13. An apparatus according to claim 10, further comprising memory means for storing the image information to which the boundary information is added.

* * * * *

UNITED STATES PATENT AND TRADEMARK OFFICE
CERTIFICATE OF CORRECTION

PATENT NO. : 5,040,078
DATED : August 13, 1991
INVENTOR(S) : MASASHI YAHARA It is certified that error appears in the above-identified patent and that said Letters Patent is hereby corrected as shown below: On the title page:

At [56] References Cited:

Line 3, "21442798  1/1985  United Kingdom" should read --2142798  1/1985  United Kingdom--;

OTHER PUBLICATIONS:

Line 4, "Manuel" should read --Manual--; and
Line 5, "Umisom" should read --Unison--.

At [57] ABSTRACT:

Line 7, "circuity" should read --circuitry--.

Signed and Sealed this

Eighteenth Day of May, 1993

Attest:

MICHAEL K. KIRK

*Attesting Officer*    Acting Commissioner of Patents and Trademarks